United States Patent
Zhang et al.

(10) Patent No.: US 12,323,209 B2
(45) Date of Patent: Jun. 3, 2025

(54) APPARATUS AND METHOD OF ENHANCED CHANNEL STATE INFORMATION (CSI) FEEDBACK FOR ENHANCED PHYSICAL DOWNLINK CONTROL CHANNEL (PDCCH) TRANSMISSION WITH MULTIPLE BEAMS FROM MULTIPLE TRANSMIT RECEIVE POINTS (TRPs)

(71) Applicant: Lenovo (Beijing) Ltd., Beijing (CN)

(72) Inventors: Yi Zhang, Chao Yang District (CN); Chenxi Zhu, Haidian District (CN); Wei Ling, Changping (CN); Bingchao Liu, Changping District (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 350 days.

(21) Appl. No.: 17/793,742

(22) PCT Filed: Feb. 14, 2020

(86) PCT No.: PCT/CN2020/075279
§ 371 (c)(1),
(2) Date: Jul. 19, 2022

(87) PCT Pub. No.: WO2021/159471
PCT Pub. Date: Aug. 19, 2021

(65) Prior Publication Data
US 2023/0123975 A1    Apr. 20, 2023

(51) Int. Cl.
*H04B 7/06* (2006.01)
*H04B 7/08* (2006.01)
*H04W 56/00* (2009.01)

(52) U.S. Cl.
CPC ........... *H04B 7/0626* (2013.01); *H04B 7/088* (2013.01); *H04W 56/001* (2013.01)

(58) Field of Classification Search
CPC .............................. H04B 7/0626; H04W 72/23
(Continued)

(56) References Cited

U.S. PATENT DOCUMENTS

| | | | | |
|---|---|---|---|---|
| 2018/0042028 A1* | 2/2018 | Nam | ..................... | H04L 5/0035 |
| 2020/0044802 A1* | 2/2020 | Park | ..................... | H04L 5/0048 |

FOREIGN PATENT DOCUMENTS

| | | |
|---|---|---|
| CN | 107925553 A | 4/2018 |
| CN | 110249574 A | 9/2019 |
| WO | 2018147665 A1 | 8/2018 |

OTHER PUBLICATIONS

PCT/CN2020/075279, "International Search Report and Written Opinion", PCT Application No. PCT/CN2020/075279, Nov. 17, 2020, 6 pages.
(Continued)

*Primary Examiner* — Kiet M Doan
(74) *Attorney, Agent, or Firm* — FIG. 1 Patents

(57) ABSTRACT

Apparatus and methods of enhanced CSI feedback for enhanced PDCCH transmission with multiple beams from multiple TRPs are disclosed. The apparatus includes: a receiver that receives a Channel State Information (CSI) report configuration for Physical Downlink Control Channel (PDCCH) transmission using a plurality of transmitting-receiving identities; receives a CSI resource configuration indicating CSI resources from the transmitting-receiving identities; and receives a Reference Signal (RS) and/or a Synchronization Signal Block (SSB) in the CSI resources from the transmitting-receiving identities; a processor that generates a CSI report based on the Reference Signal (RS) and/or the Synchronization Signal Block (SSB) received, in a format according to the CSI report configuration; and a transmitter that transmits the CSI report generated.

19 Claims, 6 Drawing Sheets

(58) Field of Classification Search
USPC .................................................. 370/329, 330
See application file for complete search history.

(56) References Cited

OTHER PUBLICATIONS

ZTE, "Draft CR to TS38.214 on TRS", 3GPP TSG RAN WG1 Meeting #95, R1-1813915, Spokane, USA [retrieved Aug. 25, 2022]. Retrieved from the internet <https://www.3gpp.org/ftp/tsg_ran/WG1_RL1/TSGR1_95/Docs?sortby=namerev>., Nov. 2018, 3 Pages.

PCT/CN2020/075279, "International Preliminary Report on Patentability", PCT Application No. PCT/CN2020/075279, Aug. 25, 2022, 5 pages.

\* cited by examiner

APPARATUS AND METHOD OF ENHANCED CHANNEL STATE INFORMATION (CSI) FEEDBACK FOR ENHANCED PHYSICAL DOWNLINK CONTROL CHANNEL (PDCCH) TRANSMISSION WITH MULTIPLE BEAMS FROM MULTIPLE TRANSMIT RECEIVE POINTS (TRPs)

FIELD

The subject matter disclosed herein relates generally to wireless communication and more particularly relates to, but not limited to, apparatus and methods of enhanced Channel State Information (CSI) feedback for enhanced Physical Downlink Control Channel (PDCCH) transmission with multiple beams from multiple Transmit Receive Points (TRPs).

BACKGROUND

The following abbreviations and acronyms are herewith defined, at least some of which are referred to within the specification.

Third Generation Partnership Project (3GPP), 5th Generation (5G), New Radio (NR), 5G Node B (gNB), Long Term Evolution (LTE), LTE Advanced (LTE-A), E-UTRAN Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Equipment (UE), Network Equipment (NE), Radio Access Technology (RAT), Receive or Receiver (RX), Transmit or Transmitter (TX), Physical Downlink Control Channel (PDCCH), Physical Downlink Shared Channel (PDSCH), Physical Broadcast Channel (PBCH), Block Error Rate (BLER), Bandwidth Part (BWP), Control Channel Element (CCE), Control Element (CE), Control Resource Set (CORESET), Channel State Information (CSI), Channel State Information Reference Signal (CSI-RS), Downlink Control Information (DCI), Frequency Division Multiple Access (FDMA), Identification (ID), Information Element (IE), Media Access Control (MAC), Multiple Input Multiple Output (MIMO), Multi-User MIMO (MU-MIMO), Physical Resource Block (PRB), Quadrature Phase Shift Keying (QPSK), Resource-Element Group (REG), Reference Signal (RS), Reference Signal Received Power (RSRP), Signal-to-Interference-Plus-Noise Ratio (SINR), Scheduling Request (SR), Synchronization Signal Block (SSB), Transmit Receive Point (TRP), Ultra Reliable Low Latency Communications (URLLC), Channel Quality Indicator (CQI), Frequency Range 1 (FR1), Frequency Range 2 (FR2), Layer 1 Reference Signal Received Power (L1-RSRP), Precoder Matrix Indicator (PMI), Rank Indicator (RI), Synchronization Signal (SS), Quasi Co-Location (QCL), CSI-RS Resource Indicator (CRI), Layer Indicator (LI), SS/PBCH Block Resource indicator (SSBRI), CSI-RS Resource Group Index (CRGI), Received Bit Mutual Information Rate (RBIR).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs are studied. A TRP is an apparatus to transmit and receive signals, and is controlled by a gNB through the backhaul between the gNB and the TRP. A TRP may also be referred to as a transmitting-receiving identity, or simply an identity.

In the current NR system, Physical Downlink Control Channel (PDCCH) is transmitted from a single TRP. PDCCH capacity is limited for the case of small bandwidth configuration or more scheduled users by Multi-User Multiple Input Multiple Output (MU-MIMO). Especially, to support high aggregation level PDCCH for cell edge UEs, it will take a large amount of the PDCCH resources, and thus increasing the PDCCH blocking probability. Further enhancement of reliability of PDCCH is also required for Ultra Reliable Low Latency Communications (URLLC) scenario.

SUMMARY

Apparatus and methods of enhanced CSI feedback for enhanced PDCCH transmission with multiple beams from multiple TRPs are disclosed.

According to a first aspect, there is provided an apparatus, including: a receiver that receives a Channel State Information (CSI) report configuration for Physical Downlink Control Channel (PDCCH) transmission using a plurality of transmitting-receiving identities; receives a CSI resource configuration indicating CSI resources from the transmitting-receiving identities; and receives a Reference Signal (RS) and/or a Synchronization Signal Block (SSB) in the CSI resources from the transmitting-receiving identities; a processor that generates a CSI report based on the Reference Signal (RS) and/or the Synchronization Signal Block (SSB) received, in a format according to the CSI report configuration; and a transmitter that transmits the CSI report generated.

According to a second aspect, there is provided an apparatus, including: a transmitter that transmits a Channel State Information (CSI) report configuration for configuring a remote device to generate a CSI report for Physical Downlink Control Channel (PDCCH) transmission using a plurality of transmitting-receiving identities; transmits a CSI resource configuration indicating CSI resources from the transmitting-receiving identities; and transmits a Reference Signal (RS) and/or a Synchronization Signal Block (SSB) in the CSI resources using the transmitting-receiving identities; and a receiver that receives the CSI report according to the CSI report configuration from the remote device; wherein the transmitter further transmits a PDCCH based on the CSI report received.

According to a third aspect, there is provided a method, including: receiving, by a receiver, a Channel State Information (CSI) report configuration for Physical Downlink Control Channel (PDCCH) transmission using a plurality of transmitting-receiving identities; receiving, by the receiver, a CSI resource configuration indicating CSI resources from the transmitting-receiving identities; receiving, by the receiver, a Reference Signal (RS) and/or a Synchronization Signal Block (SSB) in the CSI resources from the transmitting-receiving identities; generating, by a processor, a CSI report based on the Reference Signal (RS) and/or the Synchronization Signal Block (SSB) received, in a format according to the CSI report configuration; and transmitting, by a transmitter, the CSI report generated.

According to a fourth aspect, there is provided a method, including: transmitting, by a transmitter, a Channel State Information (CSI) report configuration for configuring a remote device to generate a CSI report for Physical Downlink Control Channel (PDCCH) transmission using a plurality of transmitting-receiving identities; transmitting, by the transmitter, a CSI resource configuration indicating CSI resources from the transmitting-receiving identities; transmitting, by the transmitter, a Reference Signal (RS) and/or a Synchronization Signal Block (SSB) in the CSI resources using the transmitting-receiving identities; receiving, by a receiver, the CSI report according to the CSI report configuration from the remote device; and transmitting, by the transmitter, a PDCCH based on the CSI report received.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
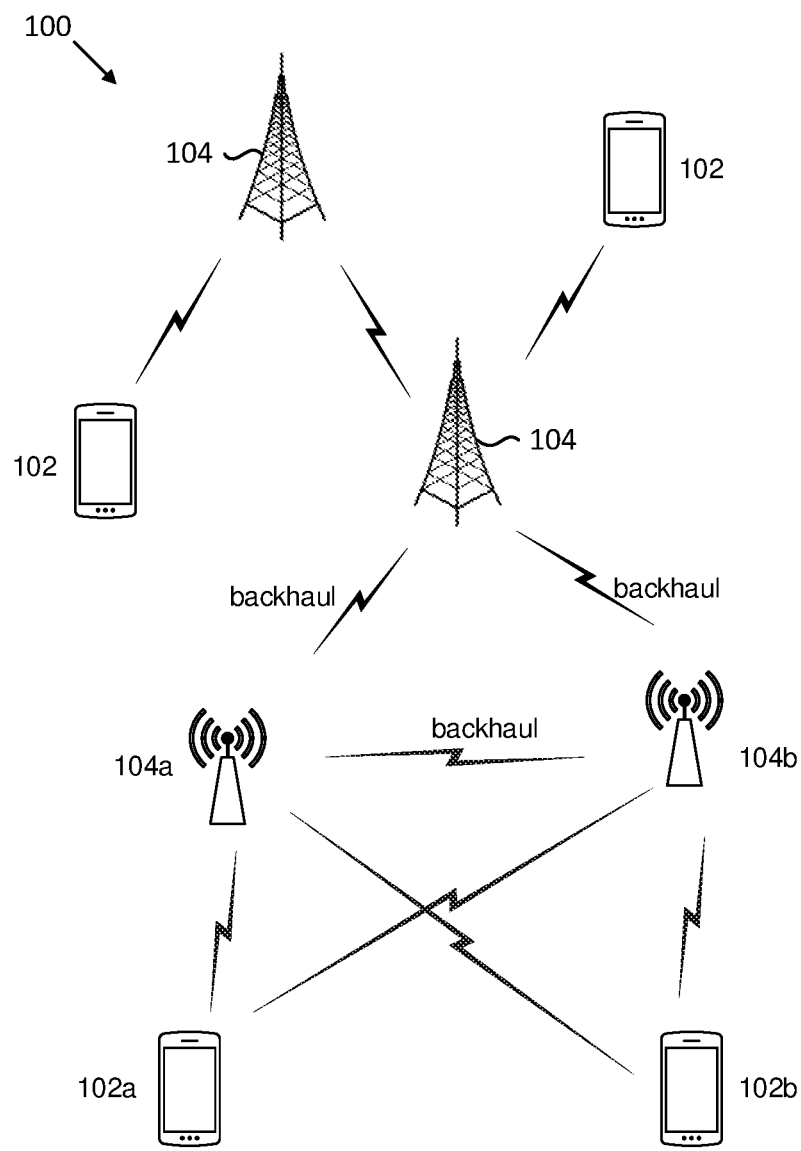
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "I" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

Figure 2:
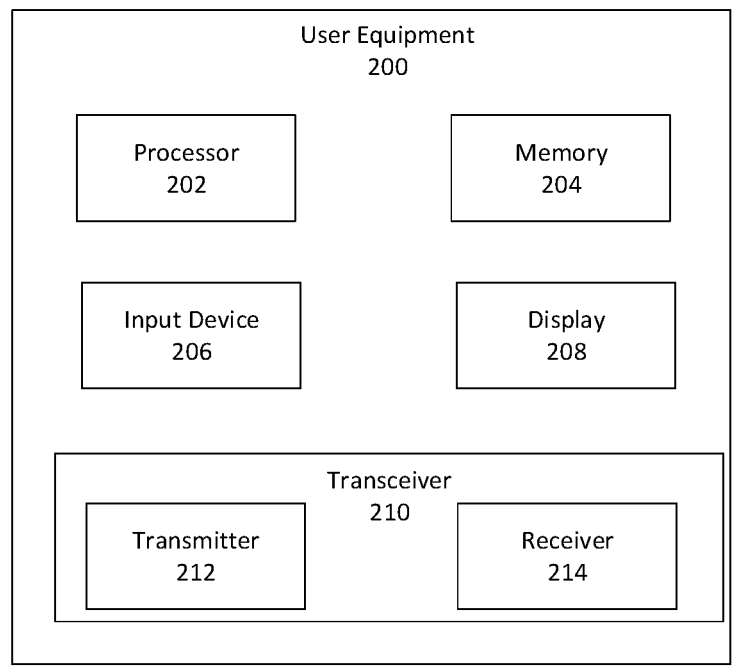
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
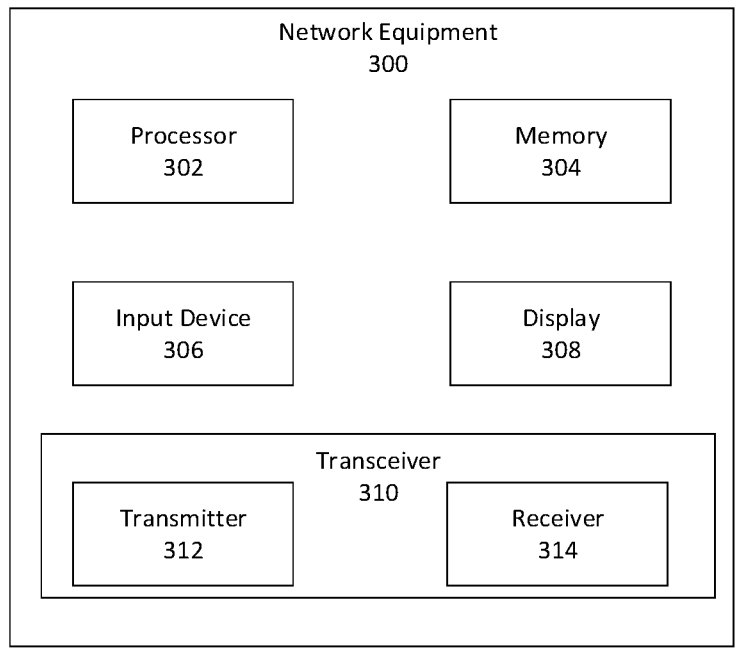
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

In the current NR design, there is no special CSI feedback for PDCCH. gNB makes resource allocation for PDCCH, including the selection of candidate, the determination of aggregation level, etc., based on the CSI feedback for data channel, e.g. PDSCH.

In the current version of NR TS38.214, the following contents are specified for CSI:

CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI) and/or Layer 1 Reference Signal Received Power (L1-RSRP).

All these CSIs are defined for PDSCH. The aggregation level for PDCCH transmission is not supported for UE feedback.

For CSI calculation, it is specified in TS38.214 as follows:
The UE shall calculate CSI parameters (if reported) assuming the following dependencies between CSI parameters (if reported)
LI shall be calculated conditioned on the reported CQI, PMI, RI and CRI CQI shall be calculated conditioned on the reported PMI, RI and CRI PMI shall be calculated conditioned on the reported RI and CRI RI shall be calculated conditioned on the reported CRI.

For report quantity, an IE CSI-ReportConfig defined in TS38.331 include a part as follows:

```
reportQuantity CHOICE {
    none                        NULL,
    cri-RI-PMI-CQI              NULL,
    cri-RI-i1                   NULL,
    cri-RI-i1-CQI SEQUENCE {
        pdsch-BundleSizeForCSI  ENUMERATED {n2, n4}
        OPTIONAL -- Need S
    },
    cri-RI-CQI                  NULL,
    cri-RSRP                    NULL,
    ssb-Index-RSRP              NULL,
    cri-RI-LI-PMI-CQI           NULL
}.
```

Based on the current specification on CSI calculation and report quantity, the CQI shall be calculated conditioned on the reported PMI, RI and CRI; and RI is calculated conditioned on the reported CRI. Thus, it does not support obtaining a CQI without the RI but with multiple CRIs.

For 'cri-RSRP' or 'ssb-Index-RSRP' reporting, the following is specified in TS38.214:

If the UE is configured with a CSI-ReportConfig with the higher layer parameter reportQuantity set to 'cri-RSRP' or 'ssb-Index-RSRP', if the UE is configured with the higher layer parameter groupBasedBeamReporting set to 'disabled' the UE is not required to update measurements for more than 64 CSI-RS and/or SSB resources, and the UE shall report in a single report nrofReportedRS (higher layer configured) different CRI or SSBRI for each report setting.

if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters.

With multiple TRPs, time-frequency resources for PDCCH transmission are increased. As a candidate scheme to exploit the additional resources, PDCCH may be transmitted from multiple TRPs simultaneously. To better support this kind of PDCCH transmission scheme, CSI feedback enhancement is required.

For PDCCH transmission from multiple TRPs, there is currently no accurate feedback mechanism for joint beam selection, where not only the channel quality but also the interference between beams from different TRPs need to be considered. Without optimized CSI feedback in consideration of interference, the gNB may not be able to choose a better beam pair with a larger channel capacity. Thus, both the PDCCH performance and the PDCCH transmission reliability may be affected.

For PDCCH transmission, the gNb needs to decide the aggregation level and resource location of candidates. With the current CSI feedback mechanism for PDSCH, the channel quality information is reported by CQI. It cannot be directly used by the gNB to determine the aggregation level and has a relative larger feedback overhead, where 4 bits are required for the CQI and only 2-3 bits are required for the aggregation level since the possible aggregation level number is $\{1, 2, 4, 8, 16\}$.

The supported reportQuantity in CSI-ReportConfig includes: none, cri-RI-PMI-CQI, cri RI-i1, cri-RI-i1-CQI, cri-RI-CQI, cri-RSRP, ssb-Index-RSRP, cri-RI-LI-PMI-CQI, cri-SINR. A new reportQuantity may be required for PDCCH specific feedback with joint beam selection and/or aggregation level.

Since the PDCCH may be transmitted with multiple beams from multiple TRPs in addition to the conventional PDCCH transmission scheme with one beam from a single TRP, the system may need to support both single-TRP PDCCH transmission and multiple-TRP PDCCH transmission. Thus, in the enhanced CSI feedback, support of the gNb to flexibly select the PDCCH transmission from one beam mode or multiple beams mode may be considered.

Figure 4:
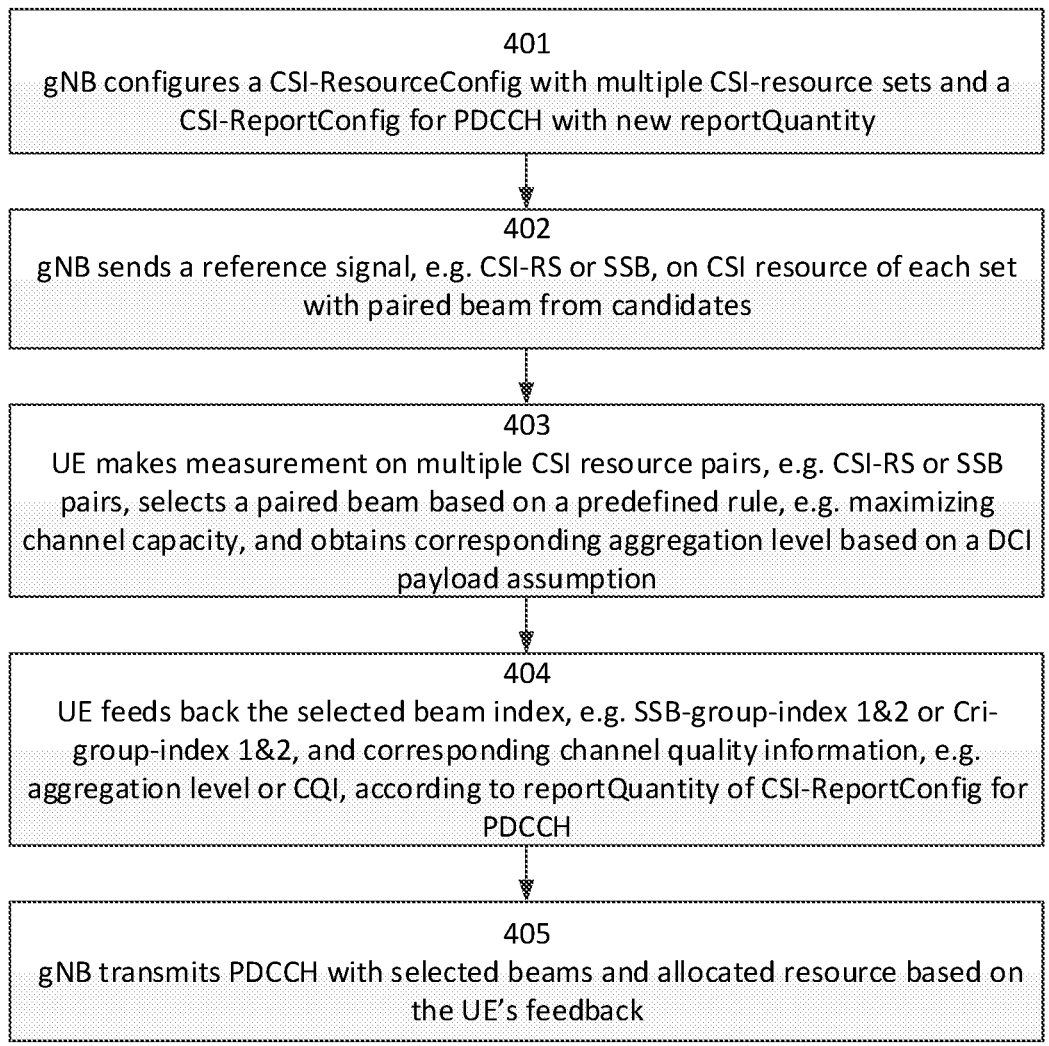
FIG. 4 is a flow chart illustrating an example of procedures for enhanced CSI feedback for PDCCH transmission from multiple TRPs in accordance with some implementations of the present disclosure.

FIG. 4 is a flow chart illustrating an example of procedures for enhanced CSI feedback for PDCCH transmission from multiple TRPs. The PDCCH is transmitted on time-frequency resources from multiple beams and/or TRPs. In step 401: gNB configures a CSI-ResourceConfig with multiple CSI-resource sets and a CSI-ReportConfig for PDCCH with new reportQuantity. In step 402: the gNB sends a reference signal, e.g. CSI-RS or SSB, on the CSI resource of each set with paired beam from candidates. For example, each candidate being a beam pair that includes one beam from a first TRP and one beam from a second TRP. In step 403: UE makes measurement on multiple CSI resource pairs, e.g. CSI-RS or SSB pairs, selects a paired beam with predefined rule, e.g. maximizing channel capacity, and obtains a corresponding channel quality information, e.g. aggregation level based on a DCI payload assumption or CQI. In some examples, the aggregation level may be derived based on a fixed DCI payload. In step 404: the UE feeds back the selected beam index, e.g. SSB-group-index 1&2 or Cri-group-index 1&2, and the corresponding channel quality information, e.g. aggregation level or CQI according to reportQuantity of CSI-ReportConfig for PDCCH. The selected beam index is a part of the CSI report, and is an indication of joint selected beams, with each beam selected from a different one of the CSI resource sets. The corresponding aggregation level is an indication of channel quality. In step 405: the gNB transmits PDCCH with selected beams and allocated resource based on the UE's feedback.

The multiple beams may be jointly selected and reported according to a predefined rule, e.g. based on maximization of channel capacity, where each selected beam is from one different TRP. This may improve PDCCH transmission reliability.

Based on the joint selected beams, an aggregation level may be derived and fed back to the gNB based on the equivalent SINR (Signal-to-Interference-Plus-Noise Ratio) from UE measurement. It matches with PDCCH transmission and facilitates PDCCH resource allocation.

Additional reportQuantity may be imported for CSI-ReportConfig which includes the joint CSI resource group index and/or aggregation level and/or joint CSI resource index and/or CQI. In some examples, it may be called Cri-Index-AggregationLevel.

Furthermore, unified CSI feedback may also be provided for the single or multiple beam transmission. A bitmap may be used to indicate whether there is any selected beam from each TRP. The aggregation level for reporting is derived based on the selected beam(s) derived by the bitmap.

Figure 5:
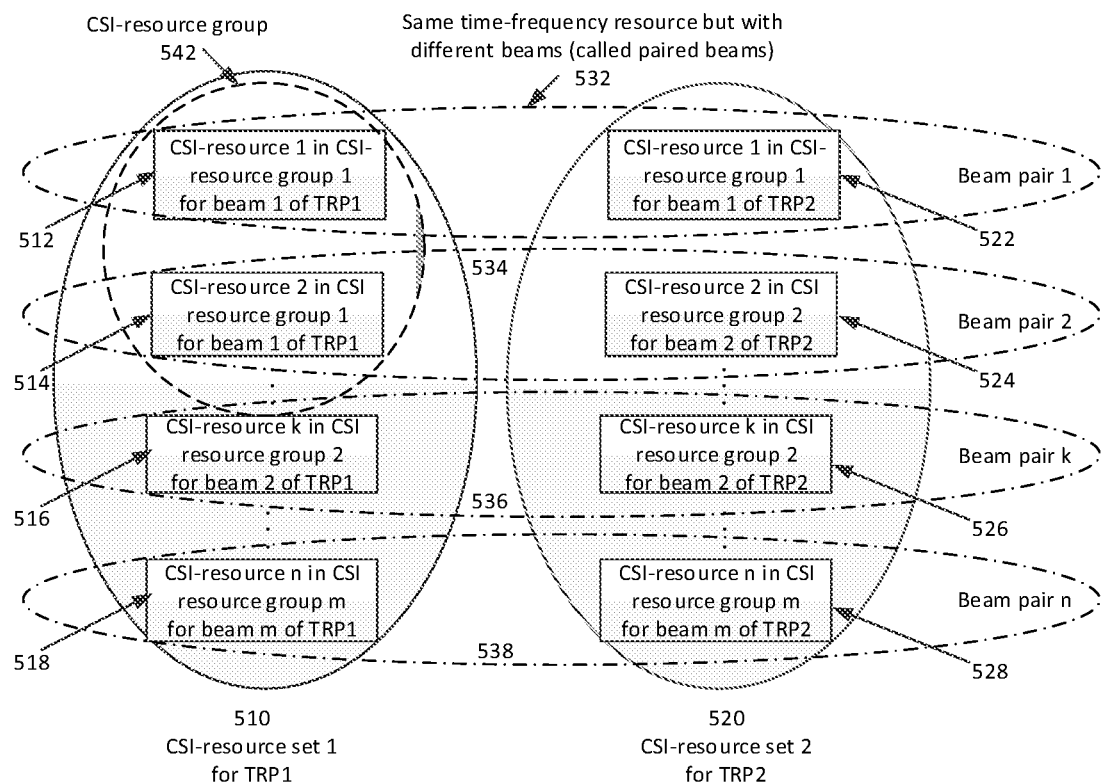
FIG. 5 is a schematic diagram illustrating an example of CSI resource configuration with multiple beam pair candidates in accordance with some implementations of the present disclosure.

FIG. 5 is a schematic diagram illustrating an example of CSI resource configuration with multiple beam pair candidates. To make accurate beam selection for PDCCH transmission from multiple TRPs, both the channel quality and interference may need to be considered together. The channel capacity may serve as the basic metric for joint beam selecting. For accurate measurement on interference, multiple paired beams may be transmitted from multiple TRPs, with beams in each pair being transmitted simultaneously.

In the exemplary configuration for CSI resources as shown in FIG. 5, multiple CSI resource sets 510 and 520 are configured, where all CSI resources in one CSI resource set is linked with one TRP. In this example, CSI resource set 1 510 is from TRP 1, and CSI resource set 520 is from TRP 2. The CSI resource set 1 510 may include, for example, CSI resource 1 512 for beam 1 of TRP 1, CSI resource 2 514 for beam 1 of TRP 1, CSI resource k 516 for beam 2 of TRP 1, CSI resource n 518 for beam m of TRP 1, and etc. The CSI resource set 2 520 may include, for example, CSI resource 1 522 for beam 1 of TRP 2, CSI resource 2 524 for beam 2 of TRP 2, CSI resource k 526 for beam 2 of TRP 2, CSI resource n 528 for beam m of TRP 2, and etc.

In each CSI resource set, there may be multiple CSI resource groups, where CSI resources, or SR/SSB, in each CSI resource group may have the same Quasi Co-Location (QCL) Type A information and/or the same QCL-Type D information. Each CSI resource group may include a plurality of CSI resources that are associated with a transmission beam from one of the TRPs. For example, CSI resource group 542 includes the CSI resource 512 and the CSI resource 514, both of which are for the beam 1 of TRP 1.

Reference Signal (RS) may include CSI-RS and/or SSB, which is transmitted on the CSI resources. Here, single port CSI-RS resource is used. The CSI resources with the same CSI resource index from different CSI resource sets are configured for CSI-RS/SSB transmission with paired beams on the same time-frequency resource. Furthermore, the CSI resources with the same index from different resource sets are used for channel part measurement since all the paired beams will be used for PDCCH transmission with spatial division multiplexing. They may also be used for the inter-beam interference calculation by implementation. Examples of the beam pair, or paired beams, may be beam pair 1 532 which includes the CSI resource 1 512 for beam 1 of TRP 1 and the CSI resource 1 522 for beam 1 of TRP 2, beam pair 2 534 which includes the CSI resource 2 514 for beam 1 of TRP 1 and the CSI resource 2 524 for beam 2 of TRP 2, beam pair k 536, beam pair n 538, and etc.

The supported candidate beam pair number may be equal to the CSI resource number in the CSI resource set. Candidate beam pairs may be set as a full set of combination of beams from different TRPs (i.e., including all combinations of beams from different TRPs) but with substantive CSI resource overhead. Alternatively, combinations among several strongest beams from different TRPs may be a choice of tradeoff between the CSI resource overhead and channel capacity. For example, four beam pairs may be used, including:

{
($1^{st}$ strongest beam from TRP1, $1^{st}$ strongest beam from TRP2),
($1^{st}$ strongest beam from TRP1, $2^{nd}$ strongest beam from TRP2), -continued ($2^{nd}$ strongest beam from TRP1, $1^{st}$ strongest beam from TRP2),
($2^{nd}$ strongest beam from TRP1, $2^{nd}$ strongest beam from TRP2)
}.

The gNB may transmit CSI-RS/SSB on the configured CSI resources with corresponding beams. If multiple receiving beams for one panel are also considered for transmitted beam pair selection, more CSI resources may be required. Based on the example, additional four CSI resources linked with four transmitted beam pairs may be required to be used for the beam pair selection linked with another UE beam.

In some examples, the RS and/or SSB in different CSI resource sets may be transmitted simultaneously from a plurality of beam pair candidates, where each beam pair candidate comprises a first beam from a first TRP and a second beam from a second TRP. The UE may then select one of the beam pair candidates according to a predefined or preset rule, e.g. the maximization of channel capacity. The CSI report may be generated by the UE with the selected beam pair.

Figure 6:
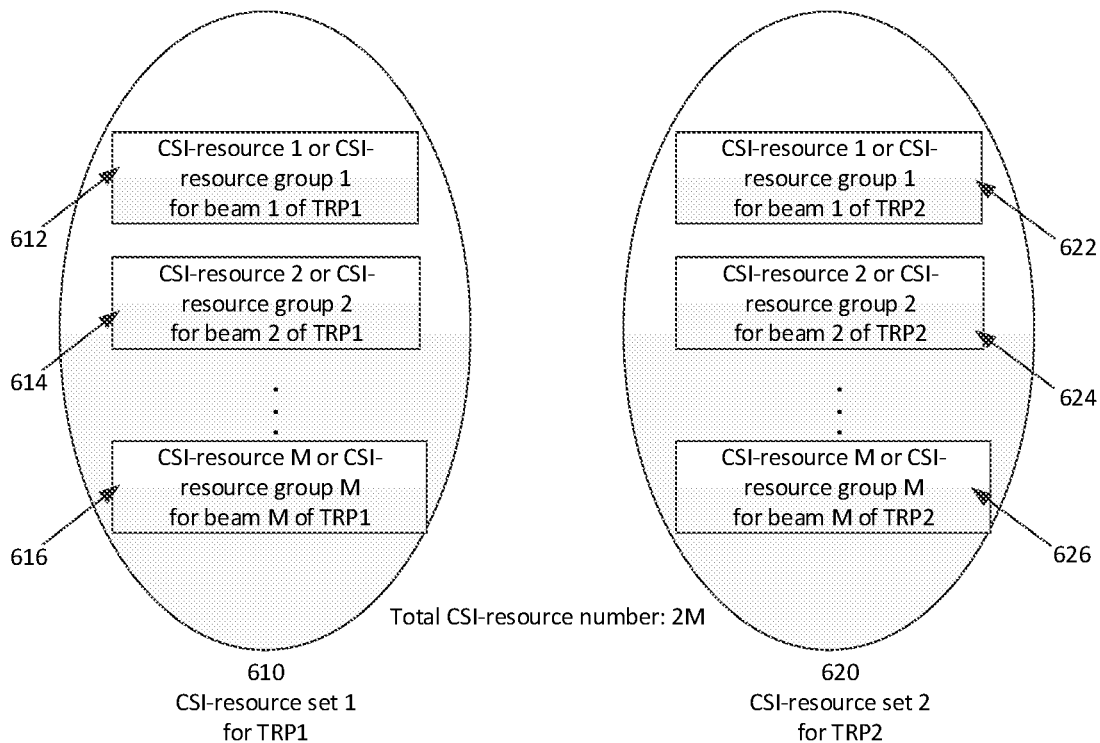
FIG. 6 is a schematic diagram illustrating a further example of CSI resource configuration with independent transmission on CSI resources in different CSI resource sets in accordance with some implementations of the present disclosure.

FIG. 6 is a schematic diagram illustrating a further example of CSI resource configuration with independent transmission on CSI resources in different CSI resource sets.

In some examples, to achieve better a tradeoff between the beam selection accuracy and CSI resource overhead, e.g. CSI-RS overhead or SSB overhead, the requirement of simultaneous transmission for CSI resources from multiple CSI resource sets may be relaxed. The CSI-RS and/or SSB on CSI-resources in different CSI resource sets may be transmitted independently. Thus, the CSI resource number in one CSI resource group may be reduced to one and thus the total number of CSI resources may be reduced to 2M, where M is the number of candidate beams from each TRP. Each CSI resource, or CSI resource group, may be linked with one transmission beam from one TRP. In the example as shown in FIG. 6, each CSI resource group includes only one CSI resource. The CSI resource set 1 610 for TRP 1 includes CSI resource 1 612 for beam 1 of TRP 1, CSI resource 2 614 for beam 2 of TRP 1, CSI resource M 616 for beam M of TRP 1, and etc. The CSI resource set 2 620 for TRP 2 includes CSI resource 1 622 for beam 1 of TRP 2, CSI resource 2 624 for beam 2 of TRP 2, CSI resource M 626 for beam M of TRP 2, and etc.

This may be used for FR2 with multiple panels at the UE side. Measurement of beam pair, e. g. beam i from TRP1 and beam j from TRP2, may be made as follows:
  i) for a first transmission or data stream, the signal part is measured based on CSI resource or resource group i from TRP 1 and the interference part is measured based on CSI resource or resource group j from TRP 2; and
  ii) for a second transmission or second data stream, the signal part is measured based on CSI resource or resource group j from TRP 2 and the interference is measured based on CSI-RS resource or resource group i from TRP 1.

For CSI report configuration, new reportQuantity is required to support feedback for joint beam selection and related channel quality information. The imported reportQuantity for CSI-ReportConfig may be Cri-Index-AggregationLevel and/or SSB-Index-AggregationLevel, which may include:
  i) for wideband reporting, two or more CSI resource group indices and one aggregation level for wideband; alternatively, two or more CSI resource indices and one aggregation level for wideband; alternatively, two or more CSI resource group indices and one CQI for wideband; and alternatively, two or more CSI resource indices and one CQI for wideband; or ii) for subband reporting, two or more CSI resource group indices and aggregation level for each subband; alternatively, two or more CSI resource group indices and CQI for each subband; alternatively, two or more CSI resource indices and aggregation level for each subband; and alternatively, two or more CSI resource indices and CQI for each subband.

The maximum number of CSI resource group or CSI resource feedback indices equals to the number of TRPs, i.e. the number of CSI resource set. In some examples, the CSI report received from the UE may include a CSI-RS Resource Indicator (CRI) index aggregation level and/or a SSB index aggregation level. In some other examples, the CSI report comprises a CSI-RS resource group index aggregation level.

Figure 7:
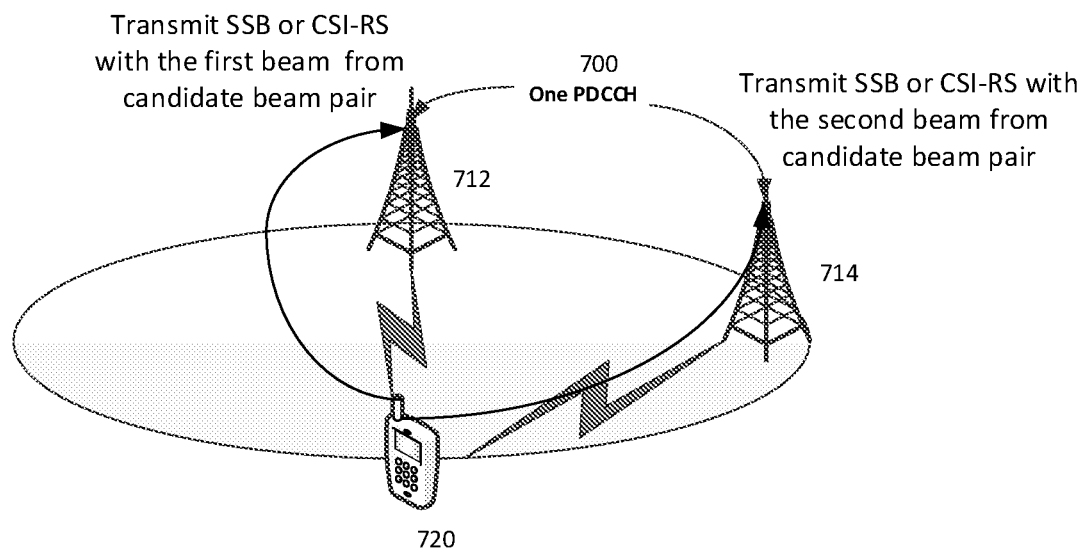
FIG. 7 is a schematic diagram illustrating an example of a system with enhanced measurement and reporting in accordance with some implementations of the present disclosure.

FIG. 7 is a schematic diagram illustrating an example of a system with enhanced measurement and reporting. In this example, two TRPs 712 and 714 are used for transmission of one PDCCH 700 to a UE 720. At the UE side, it will make measurement on the CSI resources for multiple TRPs which are in multiple CSI resource sets. The CSI resource may be a CSI-RS resource or SSB resource.

Then, the UE makes beam pair selection from the multiple beam pair candidates with a maximum channel capacity where the paired beams are transmitted from multiple TRPs on the CSI resources in its corresponding CSI resource set. For the selected beam pair, the UE may derive the corresponding channel quality information based on measurement results.

Lastly, the UE makes enhanced CSI reporting. The enhanced CSI report may include two parts, where one part of the reporting is on the joint beam selection results and the other part of the reporting is on the channel quality information. That is, the UE makes measurement on the CSI resource and feedback:

a) a joint selected beam index, e.g. CSI-RS resource group index (CRGI) or SSB-index resource group index for CSI-RS resource sets corresponding to TRP1 and TRP2, or CSI-RS resource index (CRI) or SSB-index resource index for CSI-RS resource sets corresponding to TRP1 and TRP2; and b) an aggregation level or CQI for wideband or each subband.

Figure 8:
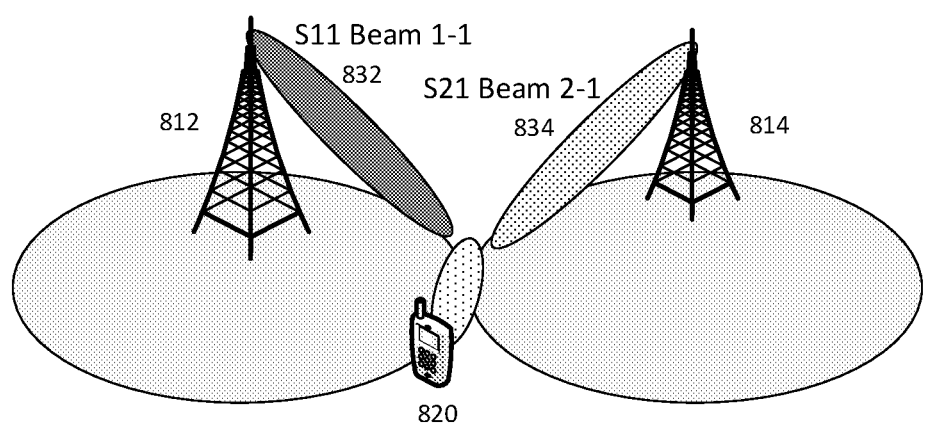
FIG. 8 is a schematic diagram illustrating an example of beam pair selection in accordance with some implementations of the present disclosure.

FIG. 8 is a schematic diagram illustrating an example of beam pair selection. The system includes two TRPs 812 and 814 for transmission of PDCCH to a UE 820. Two beams in the beam pair may include: beam 1-1 (S11) 832 from TRP 1 812, and beam 2-1 (S21) 834 from TRP 2 814.

The beams may be jointly selected from the multiple candidate beam pairs based on maximizing channel capacity with considering both the channel quality and interference by the following steps:

Step 801: For a beam pair with simultaneous transmission, the SINR is calculated as:

SINR S11=S11/(S21+I_o), and

SINR S21 may be obtained in a similar way.

The SINR is derived based on the measurement results based on the CSI resource where PDCCH is transmitted by multiple beams simultaneously. For S11 and S21 in the formula, it can be obtained by a correlation operation between the reference signal sequence and the received signal sequence.

Step 802: The equivalent SINR is obtained by RBIR (Received Bit Mutual Information Rate) algorithm. The equivalent SINR may be obtained based on SINRs for multiple beams by RBIR algorithm, which is also used for PDSCH link adaptation.

Step 803: The equivalent channel capacity is obtained using the equivalent SINR, i.e., $$C = B \times \log 2(1+\text{SINR}).$$

The channel capacity may be obtained by Shannon formula based on the equivalent SINR from step 802.

Step 804: Steps 801 to 803 are repeated for each beam pair and the beam pair with the largest channel capacity is selected for reporting. The beam pair is selected from multiple candidates based on maximization of channel capacity with the consideration of both the channel quality and interference.

The beam pair with the largest channel capacity is selected. For each beam pair, it is linked with a CSI resource which can be determined by one CSI resource group index or CSI resource index in a first CSI resource set and another CSI resource group index or CSI resource index in a second CSI resource set. Therefore, these two CSI resource group indices or two CSI resource indices may be jointly reported to the gNB, where the CSI resource group indices can be the CSI-RS or SSB resource group indices or the CSI resource indices can be the CSI-RS or SSB resource indices. The gNB may obtain the recommended beams by CSI resource group index feedback or CSI resource index feedback for each CSI resource set and use them for PDCCH transmission.

On top of reporting on jointly selected beams, channel quality information may be reported together to simplify gNB's resource allocation for PDCCH. For PDSCH transmission, the CQI is used for channel quality feedback, which is linked with the code rate and modulation mode. For PDCCH transmission, the modulation mode is fixed as Quadrature Phase Shift Keying (QPSK) to guarantee robust performance and the code rate can be derived by the aggregation level with an assumption of payload size. Thus, the aggregation level is used as a measurement of channel quality and can be selected and fed back to the gNB based on the equivalent SINR derived from UE measurement, which is similar as CQI feedback mechanism for PDSCH. For example, for each aggregation level, SINRaggregate_i can be obtained with $10^{-2}$ target Block Error Rate (BLER) from the PDCCH link level simulation curve, which is obtained based on QPSK modulation and 80 bits DCI payload size with Polar coding. The minimum aggregation level with its SINR_aggregate_i no smaller than the equivalent SINR from measurement is selected for reporting.

For feedback with aggregation level, it may be matched with PDCCH transmission as compared with CQI feedback for PDSCH. Thus, there is no additional realization for deriving the aggregation level from CQI feedback at the gNB side, thereby improving feedback accuracy. It is also easier for the gNB to allocate PDCCH resources since the PDCCH resource number is determined by the aggregation level.

To feedback aggregation level, only 3 bits are needed because there is a limited number of supported aggregation levels, i.e. {1, 2, 4, 8, 16}, whereas 4 bits are used for PDSCH CQI feedback. When the gNB configures the supported aggregation levels as {1, 2, 4, 8}, or {2, 4, 8, 16} for a search space set based on very rough channel quality information, the number of bits for feedback may be reduced to 2.

The CSI resource to derive the aggregation level may be kept in the frequency domain resource within a Control Resource Set (CORESET), which is indicated with bitmap by a higher-layer parameter frequencyDomainResources with 6 Physical Resource Block (PRB) granularity. With restriction of frequency resources into that of the CORESET, the total feedback overhead may be further reduced for subband aggregation level feedback. This may be useful for localized transmission with non-interleaved CCE-REG-Mapping type and distributed PDCCH candidates in the CORESET. As another alternative, the UE/gNB may simply assume that the Resource-Element Groups (REGs) are evenly distributed across the frequency domain in the Bandwidth Part (BWP) and the aggregation level may be derived based on this assumption. This is simple and robust since the derivation has no linkage with the specific CORESET.

Similar to PDSCH transmission from multiple TRPs, TRP(s) for PDCCH transmission may be selected based on link quality between the TRPs and UE. To support adaptive selection of beam(s) from TRP(s) for PDCCH transmission by the gNB, the UE needs to return the preferred beam(s) index and related channel quality, which may be obtained by selecting a transmission scheme with a better channel capacity. For CSI reporting for transmission with one beam from one TRP, reporting with the linked CSI resource set index, the CSI resource index in the CSI resource set and the aggregation level or CQI is required. For CSI reporting for transmission with multiple beams from multiple TRPs, reporting with the CSI resource group index or CSI resource index for each CSI resource set and the aggregation level or CQI is required. To unify CSI reporting for transmission with one beam and multiple beams, one bitmap is imported to indicate whether there is any selected beam for each CSI resource set. When there is no selected beam for one CSI resource set, the related indication field for the CSI group resource index or CSI resource index may be ignored. Since the number of CSI resource groups or CSI resources equals to the beam number for a TRP, the CSI resource group index or CSI resource index for CSI resource configuration in multiple TRP transmission case is equivalent to the CSI resource index for CSI resource configuration in single TRP transmission case. They may share the same field for beam indication and there is no ambiguity issue own to newly imported bitmap. One example is shown in Table 1 for CSI fields for unified CSI reporting for PDCCH transmission from one or multiple TRPs, where the mapping order is also clearly shown.

TABLE 1

Mapping order of CSI fields of one report for unified CSI reporting for PDCCH transmission from one or multiple TRPs

| CSI report number | CSI fields |
|---|---|
| CSI report #n | Bitmap to indicate whether there is any selected beam in a CSI resource set and the bit number equals to the CSI resource set number. "1" for with selected beam and "0" for without select beam. |
| | CSI-RS/SSB resource group index or CSI-RS/SSB resource index for the first CSI resource set if the bit in the bitmap linked with the first CSI resource set is "1". Otherwise, no valid meaning. |
| | CSI-RS/SSB resource group index or CSI-RS/SSB resource index for the second CSI resource set if the bit in the bitmap linked with the second CSI resource set is "1". Otherwise, no valid meaning. |

TABLE 1-continued

Mapping order of CSI fields of one report for unified CSI reporting for PDCCH transmission from one or multiple TRPs

| CSI report number | CSI fields |
|---|---|
| | Aggregation level or CQI for wideband or subband based on selected CSI-RS/SSB resource(s) or selected CSI-RS/SSB group(s). If subband reporting is supported, the aggregation level or CQI for each subband is concatenated according to the subband index. |

Figure 9:
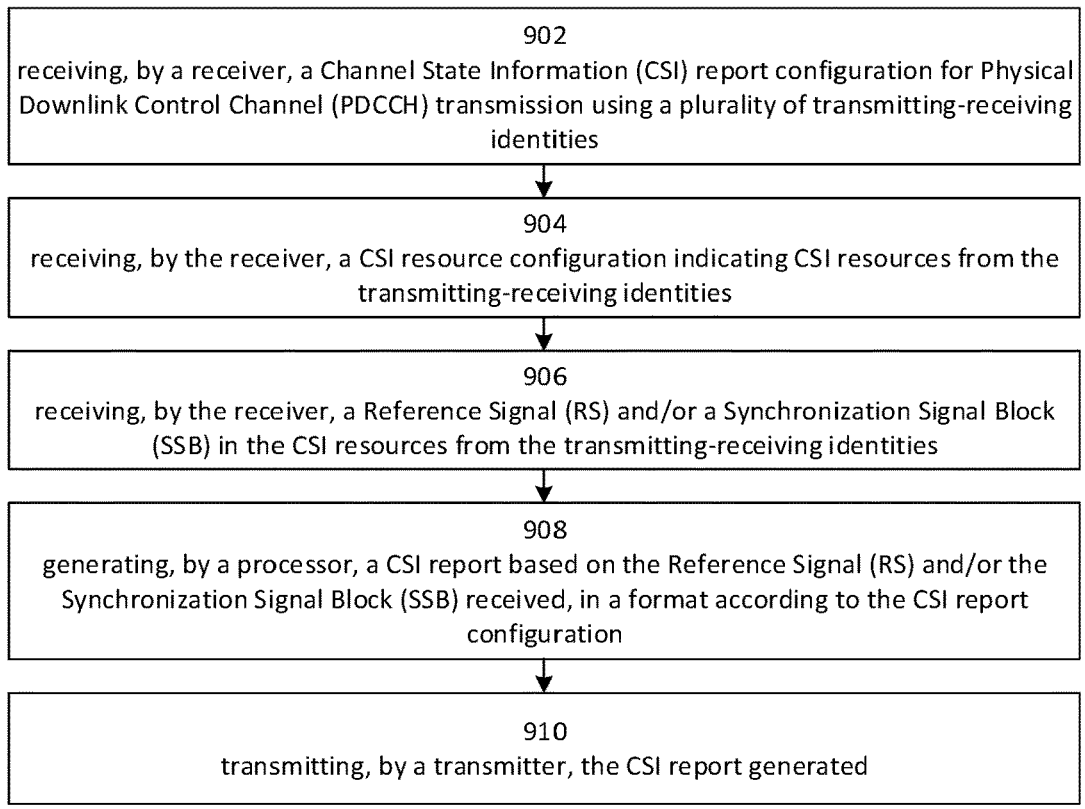
FIG. 9 is a flow chart illustrating steps of CSI feedback for enhanced PDCCH transmission with multiple beams from multiple TRPs by UE in accordance with some implementations of the present disclosure.

FIG. 9 is a flow chart illustrating steps of CSI feedback for enhanced PDCCH transmission with multiple beams from multiple TRPs by UE in accordance with some implementations of the present disclosure.

At step 902, the receiver 214 of the UE 200 receives a Channel State Information (CSI) report configuration for Physical Downlink Control Channel (PDCCH) transmission using a plurality of transmitting-receiving identities.

At step 904, the receiver 214 receives a CSI resource configuration indicating CSI resources from the transmitting-receiving identities.

At step 906, the receiver 214 receives a Reference Signal (RS) and/or a Synchronization Signal Block (SSB) in the CSI resources from the transmitting-receiving identities.

At step 908, the processor 202 of the UE 200 generates a CSI report based on the Reference Signal (RS) and/or the Synchronization Signal Block (SSB) received, in a format according to the CSI report configuration.

At step 910, the transmitter 212 of the UE 200 transmits the CSI report generated.

Figure 10:
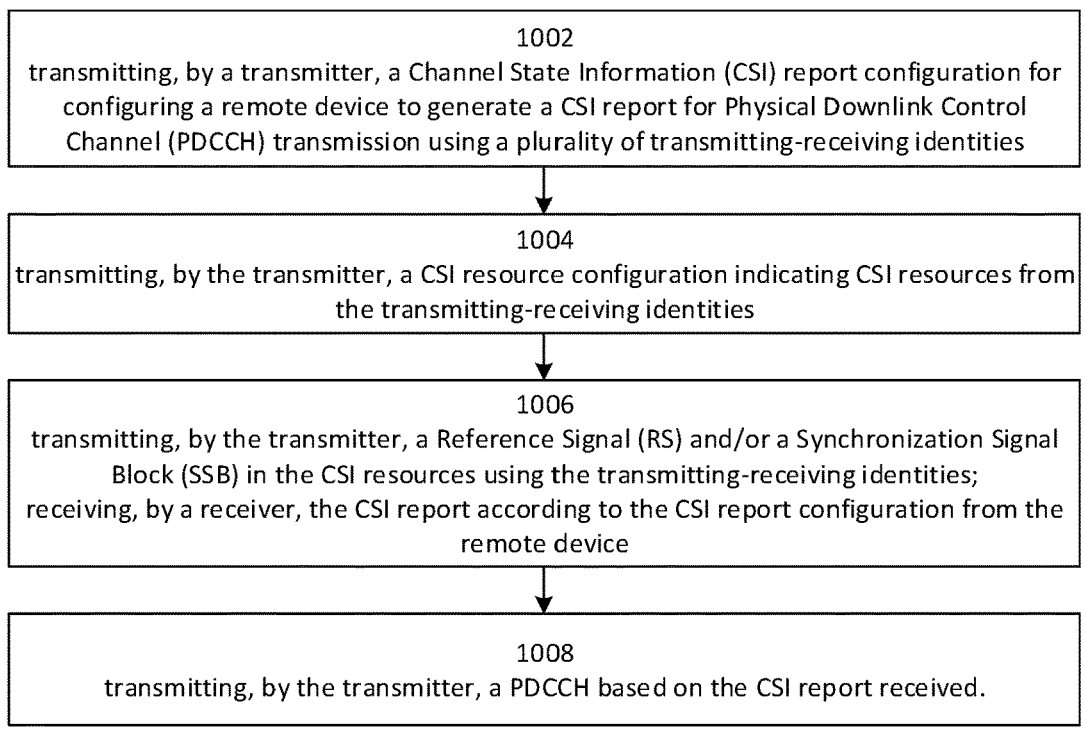
FIG. 10 is a flow chart illustrating steps of CSI feedback for enhanced PDCCH transmission with multiple beams from multiple TRPs by NE in accordance with some implementations of the present disclosure.

FIG. 10 is a flow chart illustrating steps of CSI feedback for enhanced PDCCH transmission with multiple beams from multiple TRPs by NE in accordance with some implementations of the present disclosure.

At step 1002, the transmitter 312 of the NE 300 transmits a Channel State Information (CSI) report configuration for configuring a remote device to generate a CSI report for Physical Downlink Control Channel (PDCCH) transmission using a plurality of transmitting-receiving identities.

At step 1004, the transmitter 312 transmits a CSI resource configuration indicating CSI resources from the transmitting-receiving identities.

At step 1006, the transmitter 312 transmits a Reference Signal (RS) and/or a Synchronization Signal Block (SSB) in the CSI resources using the transmitting-receiving identities.

At step 1008, the receiver 314 of the NE 300 receives the CSI report according to the CSI report configuration from the remote device.

At step 1010, the transmitter 312 further transmits a PDCCH based on the CSI report received.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A user equipment (UE) for wireless communication, comprising:
at least one memory; and
at least one processor coupled with the at least one memory and configured to cause the UE to:
receive a Channel State Information (CSI) report configuration for Physical Downlink Control Channel (PDCCH) transmission using transmitting-receiving identities, wherein the CSI report configuration comprises an Information Element (IE) with a reportQuantity part including a field comprising one or more of a CSI Reference Signal (RS) Resource Indicator (CRI) index for aggregation level or a Synchronization Signal Block (SSB) index for aggregation level;
receive a CSI resource configuration indicating CSI resources from the transmitting-receiving identities;
receive one or more of a RS or a SSB in the CSI resources from the transmitting-receiving identities;
generate a CSI report in a format according to the CSI report configuration, wherein the CSI report comprises an indication of channel quality, the indication of channel quality comprises a value of an aggregation level, and the CSI report is generated based at least in part on one or more of the RS or the SSB; and
transmit the generated CSI report.

2. The UE of claim 1, wherein the CSI resources comprise CSI resource sets; and each CSI resource set comprises one or more CSI resources from one of the transmitting-receiving identities.

3. The UE of claim 2, wherein the CSI report comprises an indication of joint selected beams, with each beam selected from a different one of the CSI resource sets.

4. The UE of claim 2, wherein each CSI resource set comprises a plurality of CSI resource groups; and each CSI resource group comprises a plurality of CSI resources that are associated with a transmission beam from one of the transmitting-receiving identities.

5. The UE of claim 2, wherein each CSI resource set comprises a plurality of CSI resource groups; and one or more of the RS or the SSB in each CSI resource group has one or more of a same Quasi Co-Location (QCL) type A information or a same QCL type D information.

6. The UE of claim 2, wherein the at least one processor is configured to cause the UE to:
receive one or more of the RS or the SSB in different CSI resource sets simultaneously from beam pair candidates, wherein each beam pair candidate comprises a first beam from a first transmitting-receiving identity and a second beam from a second transmitting-receiving identity; and
select according to a predefined rule, one of the beam pair candidates in generation of the CSI report.

7. The UE of claim 1, wherein the aggregation level is derived based on a fixed Downlink Control Information (DCI) payload.

8. The UE of claim 1, wherein the CSI report comprises one or more of the CRI index for aggregation level or the SSB index for aggregation level.

9. A network equipment (NE) for wireless communication, comprising:
at least one memory; and
at least one processor coupled with the at least one memory and configured to cause the NE to:
transmit a Channel State Information (CSI) report configuration for configuring a remote device to generate a CSI report for Physical Downlink Control Channel (PDCCH) transmission using transmitting-receiving identities, wherein the CSI report configuration comprises an Information Element (IE) with a reportQuantity part including a field comprising one or more of a CSI Reference Signal (RS) Resource Indicator (CRI) index for aggregation level or a Synchronization Signal Block (SSB) index for aggregation level;
transmit a CSI resource configuration indicating CSI resources from the transmitting-receiving identities;
transmit one or more of a RS or a SSB in the CSI resources using the transmitting-receiving identities;
receive the CSI report according to the CSI report configuration from the remote device, wherein the CSI report comprises an indication of channel quality, and the indication of channel quality comprises a value of an aggregation level; and
transmit a PDCCH based on the received CSI report.

10. The NE of claim 9, wherein the CSI resources comprise CSI resource sets; and each CSI resource set comprises one or more CSI resources from one of the transmitting-receiving identities.

11. The NE of claim 10, wherein the CSI report comprises an indication of joint selected beams, with each beam selected from a different one of the CSI resource sets.

12. The NE of claim 10, wherein each CSI resource set comprises a plurality of CSI resource groups; and each CSI resource group comprises a plurality of CSI resources that are associated with a transmission beam from one of the transmitting-receiving identities.

13. The NE of claim 10, wherein each CSI resource set comprises a plurality of CSI resource groups; and one or more of the RS or the SSB in each CSI resource group has one or more of a same Quasi Co-Location (QCL) type A information or a same QCL type D information.

14. The NE of claim 10, wherein the at least one processor is configured to cause the NE to transmit one or more of the RS or the SSB in different CSI resource sets simultaneously from a plurality of beam pair candidates, wherein each beam pair candidate comprises a first beam from a first transmitting-receiving identity and a second beam from a second transmitting-receiving identity.

15. The NE of claim 9, wherein the aggregation level is derived based on a fixed Downlink Control Information (DCI) payload.

16. A method performed by a user equipment (UE), the method comprising:
receiving a Channel State Information (CSI) report configuration for Physical Downlink Control Channel (PDCCH) transmission using transmitting-receiving identities, wherein the CSI report configuration comprises an Information Element (IE) with a reportQuantity part including a field comprising one or more of a CSI Reference Signal (RS) Resource Indicator (CRI) index for aggregation level or a Synchronization Signal Block (SSB) index for aggregation level;
receiving a CSI resource configuration indicating CSI resources from the transmitting-receiving identities;
receiving one or more of a RS or a SSB in the CSI resources from the transmitting-receiving identities;
generating a CSI report in a format according to the CSI report configuration, wherein the CSI report comprises an indication of channel quality, the indication of channel quality comprises a value of an aggregation level, and the CSI report is generated based at least in part on one or more of the RS or the SSB; and transmitting the generated CSI report.

17. The method of claim 16, wherein the CSI resources comprise a plurality of CSI resource sets; and each CSI resource set comprises one or more CSI resources from one of the transmitting-receiving identities.

18. A processor for wireless communication, comprising:
at least one controller coupled with at least one memory and configured to cause the processor to:
receive a Channel State Information (CSI) report configuration for Physical Downlink Control Channel (PDCCH) transmission using transmitting-receiving identities, wherein the CSI report configuration comprises an Information Element (IE) with a reportQuantity part including a field comprising one or more of a CSI Reference Signal (RS) Resource Indicator (CRI) index for aggregation level or a Synchronization Signal Block (SSB) index for aggregation level;

receive a CSI resource configuration indicating CSI resources from the transmitting-receiving identities;

receive one or more of a RS or a SSB in the CSI resources from the transmitting-receiving identities;

generate a CSI report in a format according to the CSI report configuration, wherein the CSI report comprises an indication of channel quality, the indication of channel quality comprises a value of an aggregation level, and the CSI report is generated based at least in part on one or more of the RS or the SSB; and transmit the generated CSI report.

19. The processor of claim 18, wherein the CSI resources comprise a plurality of CSI resource sets; and each CSI resource set comprises one or more CSI resources from one of the transmitting-receiving identities.

* * * * *